United States Patent
Aljubran et al.

(10) Patent No.: US 10,641,079 B2
(45) Date of Patent: May 5, 2020

(54) SOLIDIFYING FILLER MATERIAL FOR WELL-INTEGRITY ISSUES

(71) Applicant: Saudi Arabian Oil Company, Dhahran (SA)

(72) Inventors: Mohammad Aljubran, Dammam (SA); Hussain AlBahrani, Qatif (SA); Sameeh Issa Batarseh, Dhahran Hills (SA); Timothy E. Moellendick, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 63 days.

(21) Appl. No.: 15/974,350

(22) Filed: May 8, 2018

(65) Prior Publication Data

US 2019/0345812 A1    Nov. 14, 2019

(51) Int. Cl.
| | |
|---|---|
| *E21B 47/002* | (2012.01) |
| *E21B 47/00* | (2012.01) |
| *E21B 33/138* | (2006.01) |
| *E21B 47/06* | (2012.01) |
| *G01V 8/00* | (2006.01) |
| *G01V 11/00* | (2006.01) |

(52) U.S. Cl.
CPC ........ *E21B 47/0002* (2013.01); *E21B 33/138* (2013.01); *E21B 47/0006* (2013.01); *E21B 47/06* (2013.01); *E21B 47/065* (2013.01); *G01V 8/00* (2013.01); *G01V 11/002* (2013.01)

(58) Field of Classification Search
CPC .............. E21B 47/0002; E21B 33/138; E21B 47/0006; E21B 47/06; E21B 47/065; E21B 33/13; G01V 8/00; G01V 11/002
See application file for complete search history.

(56) References Cited

U.S. PATENT DOCUMENTS

| | | |
|---|---|---|
| 2,757,738 A | 9/1948 | Ritchey |
| 2,795,279 A | 6/1957 | Erich |
| 2,799,641 A | 7/1957 | Gordon |
| 3,016,244 A | 1/1962 | Friedrich et al. |
| 3,103,975 A | 9/1963 | Hanson |
| 3,104,711 A | 9/1963 | Haagensen |

(Continued)

FOREIGN PATENT DOCUMENTS

| | | |
|---|---|---|
| CA | 2669721 | 7/2011 |
| CN | 204627586 | 9/2015 |

(Continued)

OTHER PUBLICATIONS

International Search Report and Written Opinion issued in International Application No. PCT/US2019/017439 dated Jul. 1, 2019, 23 pages.

(Continued)

*Primary Examiner* — Brad Harcourt

(74) *Attorney, Agent, or Firm* — Fish & Richardson P.C.

(57) ABSTRACT

In some aspects, a method includes imaging a casing, completed wellbore, or open wellbore. An integrity problem is with the casing, completed wellbore, or open wellbore is determined based on the imaging. A placement zone for a filler, a filler amount, and filler parameters for the integrity problem is determined. The filler in the filler amount is injected in the placement zone. The filler is solidified at the placement zone.

18 Claims, 7 Drawing Sheets

(56) References Cited

U.S. PATENT DOCUMENTS

| | | |
|---|---|---|
| 3,114,875 A | 12/1963 | Haagensen |
| 3,133,592 A | 5/1964 | Tomberlin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,211,220 A | 10/1965 | Erich |
| 3,428,125 A | 2/1969 | Parker |
| 3,522,848 A | 8/1970 | New |
| 3,547,192 A | 12/1970 | Claridge et al. |
| 3,547,193 A | 12/1970 | Gill |
| 3,642,066 A | 2/1972 | Gill |
| 3,696,866 A | 10/1972 | Dryden |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,084,637 A | 4/1978 | Todd |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,193,448 A | 3/1980 | Jearnbey |
| 4,193,451 A | 3/1980 | Dauphine |
| 4,196,329 A | 4/1980 | Rowland et al. |
| 4,199,025 A | 4/1980 | Carpenter |
| 4,265,307 A | 5/1981 | Elkins |
| RE30,738 E | 9/1981 | Bridges et al. |
| 4,301,865 A | 11/1981 | Kasevich et al. |
| 4,320,801 A | 3/1982 | Rowland et al. |
| 4,373,581 A | 2/1983 | Toellner |
| 4,396,062 A | 8/1983 | Iskander |
| 4,412,585 A | 11/1983 | Bouck |
| 4,449,585 A | 5/1984 | Bridges et al. |
| 4,457,365 A | 7/1984 | Kasevich et al. |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,576,231 A | 3/1986 | Dowling et al. |
| 4,583,589 A | 4/1986 | Kasevich |
| 4,592,423 A | 6/1986 | Savage et al. |
| 4,612,988 A | 9/1986 | Segalman |
| 4,620,593 A | 11/1986 | Haagensen |
| 4,660,636 A | 4/1987 | Rundell et al. |
| 4,705,108 A | 11/1987 | Little et al. |
| 4,817,711 A | 4/1989 | Jearnbey |
| 5,055,180 A | 10/1991 | Klaila |
| 5,068,819 A | 11/1991 | Misra et al. |
| 5,082,054 A | 1/1992 | Kiamanesh |
| 5,236,039 A | 8/1993 | Edelstein et al. |
| 5,899,274 A | 5/1999 | Frauenfeld et al. |
| 6,041,860 A * | 3/2000 | Nazzal ............... E21B 23/002 166/250.01 |
| 6,189,611 B1 | 2/2001 | Kasevich |
| 6,413,399 B1 | 7/2002 | Kasevich |
| 6,544,411 B2 | 4/2003 | Varandaraj |
| 6,678,616 B1 | 1/2004 | Winkler et al. |
| 6,814,141 B2 | 11/2004 | Huh et al. |
| 7,048,051 B2 | 5/2006 | McQueen |
| 7,091,460 B2 | 8/2006 | Kinzer |
| 7,109,457 B2 | 9/2006 | Kinzer |
| 7,115,847 B2 | 10/2006 | Kinzer |
| 7,312,428 B2 | 12/2007 | Kinzer |
| 7,331,385 B2 | 2/2008 | Symington |
| 7,445,041 B2 | 11/2008 | O'Brien |
| 7,461,693 B2 | 12/2008 | Considine et al. |
| 7,484,561 B2 | 2/2009 | Bridges |
| 7,562,708 B2 | 7/2009 | Cogliandro et al. |
| 7,629,497 B2 | 12/2009 | Pringle |
| 7,631,691 B2 | 12/2009 | Symington et al. |
| 7,677,673 B2 | 3/2010 | Tranquilla et al. |
| 8,526,171 B2 | 9/2013 | Wu et al. |
| 8,960,215 B2 | 2/2015 | Cui et al. |
| 2004/0256103 A1 | 12/2004 | Batarseh |
| 2006/0106541 A1 | 5/2006 | Hassan et al. |
| 2007/0131591 A1 | 6/2007 | Pringle |
| 2007/0137852 A1 | 6/2007 | Considine et al. |
| 2007/0187089 A1 | 8/2007 | Bridges |
| 2007/0204994 A1 | 9/2007 | Wimmersperg |
| 2007/0289736 A1 | 12/2007 | Kearl et al. |
| 2009/0259446 A1 | 10/2009 | Zhang et al. |
| 2011/0011576 A1* | 1/2011 | Cavender ............... E21B 33/13 166/177.1 |
| 2012/0012319 A1 | 1/2012 | Dennis |
| 2013/0008653 A1 | 1/2013 | Schultz et al. |
| 2013/0126164 A1 | 5/2013 | Sweatman et al. |
| 2013/0213637 A1 | 8/2013 | Kearl |
| 2014/0278111 A1 | 9/2014 | Gerrie et al. |
| 2014/0360778 A1 | 12/2014 | Batarseh |
| 2016/0247316 A1* | 8/2016 | Whalley ............. E21B 47/0002 |
| 2017/0234104 A1* | 8/2017 | James ................. E21B 33/138 166/253.1 |
| 2018/0010419 A1 | 1/2018 | Livescu et al. |

FOREIGN PATENT DOCUMENTS

| | | |
|---|---|---|
| CN | 107462222 | 12/2017 |
| EP | 2317068 | 5/2011 |
| EP | 2737173 | 6/2014 |
| WO | WO2009020889 | 2/2009 |
| WO | WO2011038170 | 3/2011 |
| WO | WO2015095155 | 6/2015 |
| WO | WO2017011078 | 1/2017 |

OTHER PUBLICATIONS

Ruiter et al., "3D ultrasound computer tomography of the breast: A new era?" European Journal of Radiology 81S1, Sep. 2012, 2 pages.

Gemmeke and Ruiter, "3D ultrasound computer tomography for medical imagining," Nuclear Instruments and Methods in Physics Research A 580, Oct. 1, 2007, 9 pages.

Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.

International Search Report and Written Opinion issued in International Application No. PCT/US2019/017441 dated Apr. 23, 2019, 17 pages.

International Search Report and Written Opinion issued in International Application No. PCT/US2019/030171 dated Jul. 22, 2019, 14 pages.

Invitation to Pay Additional Fees and, Where Applicable, Protest Fee, issued in International Application No. PCT/US2019/017439 dated Apr. 18, 2019, 14 pages.

* cited by examiner

SOLIDIFYING FILLER MATERIAL FOR WELL-INTEGRITY ISSUES

BACKGROUND

Well-integrity issues can be complicated and difficult to cure with standard commercial solutions. These issues can include micro-casing leaks, severe lost circulation fractures, unstable borehole walls, as well as others. Standard commercial solutions include cement squeeze and plugs, sealant technologies, mechanical repairs, and others, but these solutions suffer from several drawbacks, such as integrity and isolation limitations, excessive time and cost, and downhole restriction. The aforementioned well-integrity issues are hard to weld and clad together since the standard commercial solutions are severe and require an external material supply to fill in the large gaps.

SUMMARY

In some aspects, a method includes imaging a casing, completed wellbore, or open wellbore. An integrity problem is with the casing, completed wellbore, or open wellbore is determined based on the imaging. A placement zone for a filler, a filler amount, and filler parameters for the integrity problem is determined. The filler in the filler amount is injected in the placement zone. The filler is solidified at the placement zone.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

The present disclosure is directed to a filler-material technique that includes a hardware solution for cased or open hole integrity problems. For example, the hardware solution can include imaging an integrity problem, introducing a specific amount of filler, and triggering and solidifying the filler material. In general, integrity problems can include casing deterioration and leaks, lost circulation, and wellbore rock instability and reactivity. The filler material to address such problems can take any form (for example, gas, liquid, solid) and composition can be based on wellbore conditions. The filler is conveyed downhole and activated in place using at least one of an electrical current, laser, plasma, acoustic waves, pressure and temperature activation, chemical reaction, or others. In some implementations, the filler material can be incorporated in an assembly including imaging tools, a control and placement device and associated algorithms, an energy-activation source, or other elements. In these instances, the imaging tools can locate and image a troublesome zone, and the control and placement device can use the associated algorithm to determine a placement zone, an amount, and filler type. In addition, the energy activation source can trigger the filler material, which is then allowed to solidify. Alternatively, or in combination, a remote control option may enable remote selection of filler type and associated parameters. The triggered and solidified filler can be capable of rebuilding casing strings downhole and curing or otherwise reducing lost circulation and hole instability problems.

Figure 1:
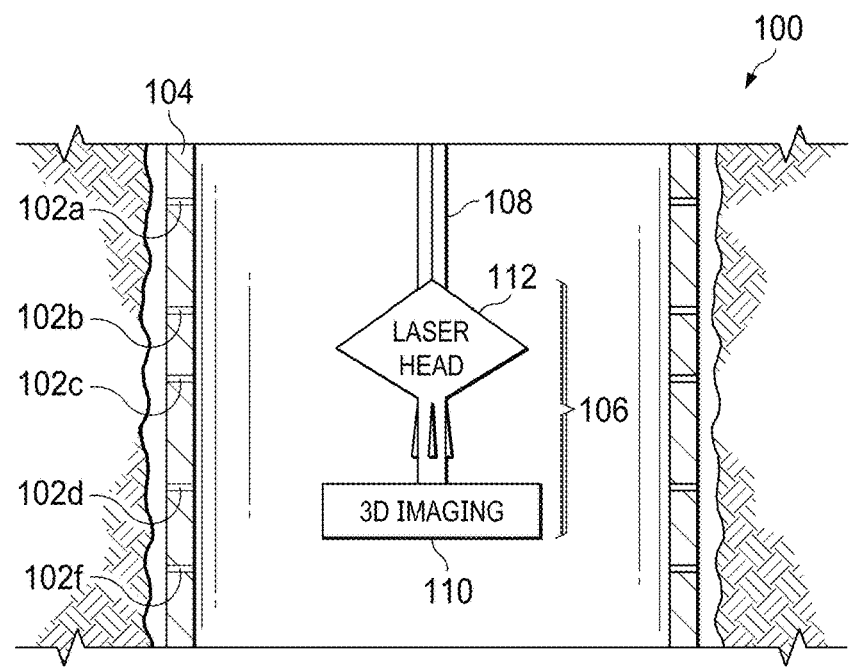
FIG. 1 is a schematic diagram of example filler material in accordance to some implementations of the present disclosure.

FIG. 1 is an example system 100 of filler material 102 applied to integrity problems in accordance with some implementations of the present disclosure. For example, the filler material 102a-f can seal casing leaks or other integrity problems. Integrity problems can result in open hole lost circulation problems, borehole rock instability issues, cased hole leaking, split casing issues, or others. By injecting, triggering, and solidifying the filler material 102 on integrity problems, the system 100 can provide one or more of the following: welding and sealing the lost circulation zones while drilling; welding and sealing fractured and unconsolidated rock zones while drilling; welding casing leaks and split zones; rebuilding deteriorated casing sections; or other solutions.

As illustrated, the filler material 102 seals leaks in a casing 104. The system 100 includes an assembly 106 attached or otherwise affixed to a drill string 108 (for example, a drill string) and configured to image integrity problems and inject, trigger, and solidify the filler material 102. In the illustrated implementation, assembly 106 includes a 3D imaging tool 110 and a laser head 112. The 3D imaging tool 110 is configured to generate 3D images of the wellbore including integrity problems. The 3D imaging tool 110 can be at least one of seismic, acoustic, optical, or other imaging types. In some implementations, the 3D imaging tool 110 can be configured to scan a wellbore to locate any integrity problems (e.g., leaks) and determine filler parameters based on the scan and one or more associated algorithms. The filler parameters include at least one of a placement zone, a filler type, a filler amount, shape, size, rheology, or others. The one or more associated algorithms may determine a filler type based on downhole conditions such as temperature, pressure, sour gases, type of drilling fluid, or others. Alternatively, or in combination, the 3D imaging tool 110 may transmit the scan to the surface through a fiber-optic cable 114 or other type of cable. In these instances, a remote control device may update or provide filler parameters to the assembly 106.

The laser head 112 is configured to emit a laser based on one or more filler parameters. For example, the laser head 112 may include one or more optical components such as one or more lenses, one or more mirrors, or other passive or active components. In some implementations, the laser head 112 receives a laser beam from the fiber-optic cable 114 and directs, for a determined duration, the laser beam at filler material 102 in a placement zone. As previously mentioned, the assembly 106 may trigger and solidify the filler material 102 using other energy sources without departing from the scope of the disclosure.

In some aspects of operation, the assembly 106 can inject a solid filler material 102 in a leak in the casing 104 and rebuild deteriorated casing sections. The 3D imaging tool 110 located on the bottom of the drill string 108 scans and locates the leaks and feeds this data to an algorithm. In response to filler parameters determined, the 3D imaging tool 110 outputs one or more commands to the laser head 112 to point the laser beam (activation source) at the filler material 102 in the placement zone to seal the leaks.

Figure 2:
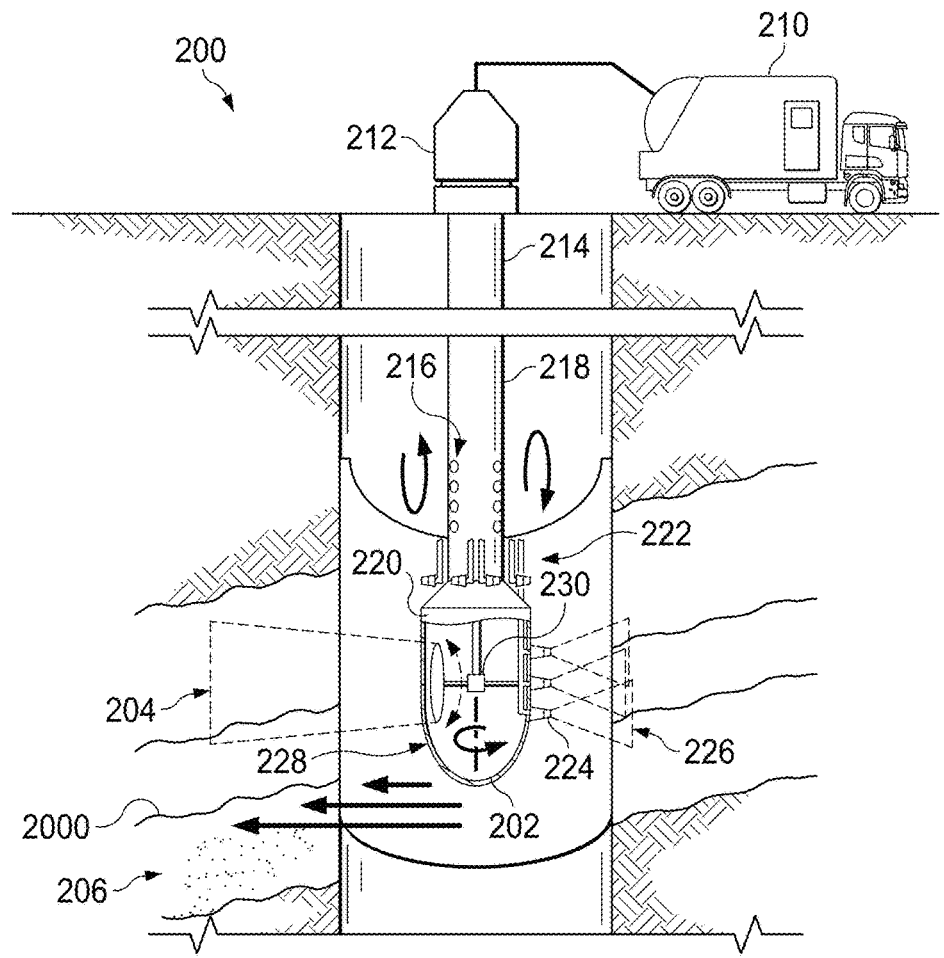
FIG. 2 is a schematic diagram of a laser head system in accordance with some implementations of the present disclosure.

FIG. 2 is a schematic diagram of a laser head system 200 for addressing integrity problems. As illustrated, the laser head system 200 includes a downhole laser tool 202 configured to direct a laser beam 204 to solidify filler material 206 in a formation. In doing so, the laser head system 200 can, in some implementations, prevent or otherwise reduce open hole lost circulation or borehole rock instability.

In the illustrated implementation, the laser head system 200 includes a laser unit 210 at a surface that emits the laser beam 204, and the laser beam 204 is transmitted through one or more fiber optic cables 212 to the downhole laser tool 202. In some implementations, the one or more fiber optic cables 212 are located in an inner volume defined by an inner wall of the drill string 214. Alternatively or in combination, at least a portion of the laser beam 204 may be generated at the downhole laser tool 202. The laser beam 204 exits from the fiber optic cables 212 into the downhole laser tool 202. The downhole laser tool 202 can include one or more optical elements (e.g., a set of lenses, a set of mirrors) that controls the size of the laser beam 204. For example, the downhole laser tool 202 can focus or collimate the laser beam 204 based on the application and the target area size. In some implementations, the downhole laser tool 202 can trigger the filler material 206 using heat, as well as cool the triggered filler material 206. In some instances, the downhole laser tool 202 can rotate covering the targeted area while heating or cooling the filler material 206. The downhole laser tool 202 can have acoustic capabilities with transducers and geophones 216 to monitor and record the velocity reflected and transmitted through the filler material 206. The reflection and transmission velocity can indicate the maturity and the phase of the filler material 206, which indicates the operation success and functionality and if the fillers are solidified and sealed. Velocity and transient time differ with different materials. Solids and fluids have different transient times which allows for evaluating the maturing of the applied and treated filler material.

The downhole laser tool 202 receives power from a power cable 218 to power a motor 220, a set of purging nozzles 222, and a set of cooling nozzles 224. The motor 220 is configured to aim the downhole laser tool 202 at a placement zone, and the set of purging nozzles 222 are located at the top for cleaning, purging, and controlling the access material coming out of the fillers and defected zone. The pruging nozzles 222 typical y clean debris and clear the path for the laser beam. The cooling nozzles 224 emit a cooling agent 226 (for example, gas, fluid) to cool down the filler material 206 to assist in solidification. By quickly cooling, the amount of filler material 206 can be maximized or otherwise increased as compared without active cooling. In some implementations, the laser beam 204 may be emitted from a side of the downhole laser tool 202 opposite to emissions of the cooling agent 226 and the emissions may overlap or be concurrent in time. In some implementations, the downhole laser tool 202 has a protective case 228 and rotates using a rotational motor 230.

Figure 3:
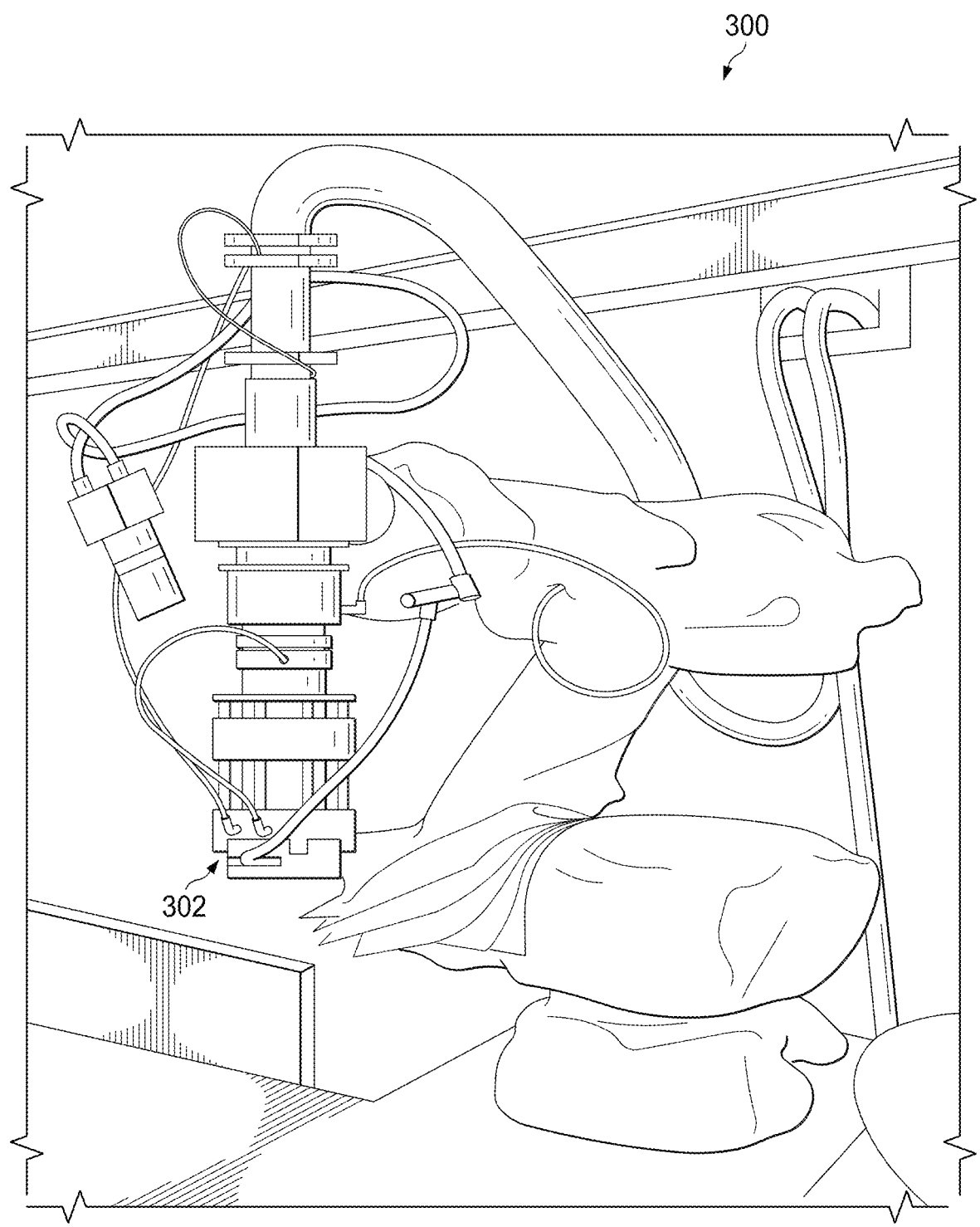
FIGS. 3-6 illustrate laser-triggered filler in accordance with some implementations of the present disclosure.
Figure 4:
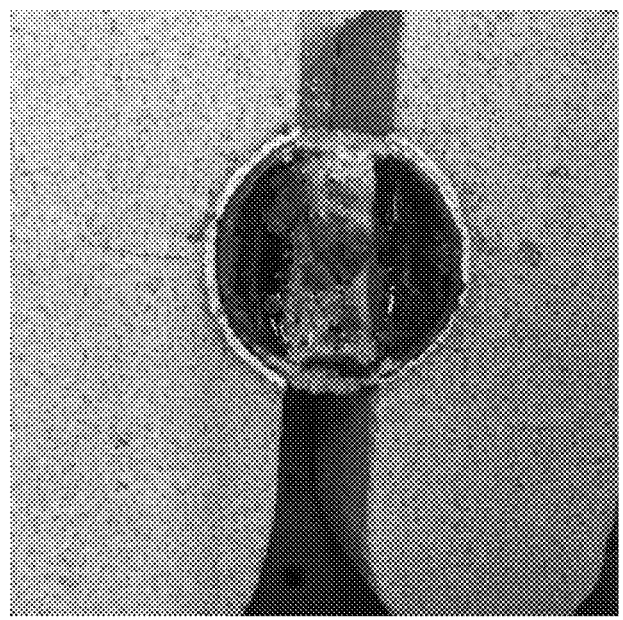
Figure 5:
Figure 6:
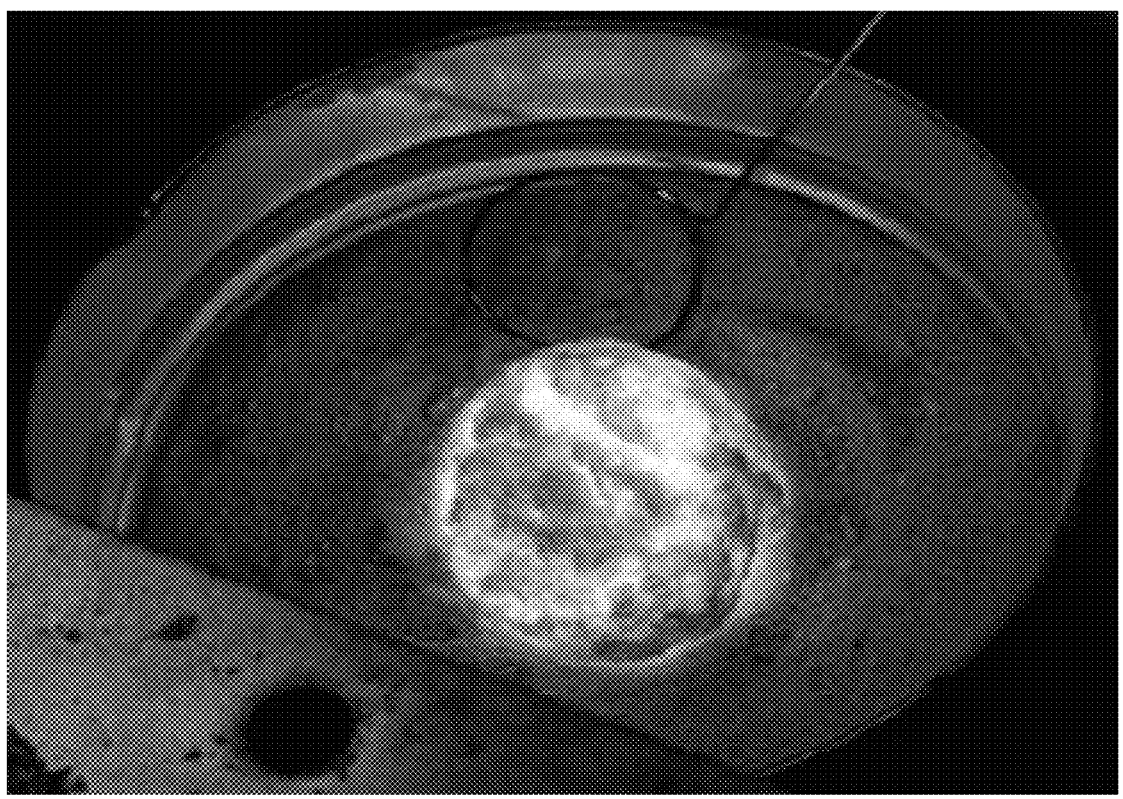

FIGS. 3-6 illustrate an example experimental setup and results in accordance with some implementations of the present disclosure. FIG. 3 illustrates an example laser head system 300 including a high power laser 302 for triggering sealant filler materials. As illustrated, the high power laser 302 is a high power ytterbium multiclad fiber laser with 8-axis robotic system. The high power laser 302 was used to evaluate different filler materials for cased or open hole integrity problems. The high power laser 302 was used to test different rock types using sand (e.g., silica) as filler material. In these experiments, two pieces of rock from the same source were closely positioned to stimulation wellbore fractures such as 5 centimeters or less. The filler material (for example, silica) was injected into the gap between the two rock pieces. The high power laser emitted a one-inch collimated beam at 2 kilowatts (kW) energy for 20 seconds to trigger and solidify the filler material, which formed sealed zones closing the fractures for lost circulation. FIG. 4 is an image 400 of laser-triggered filler material and sealing a fracture in carbonate rocks. FIG. 5 is an image 500 of laser-triggered filler material and sealing a fracture in igneous rocks. In comparison to carbonate rocks, granite has a high compressive strength. FIG. 6 is an image 600 of triggering filler material for solidification.

Figure 7:
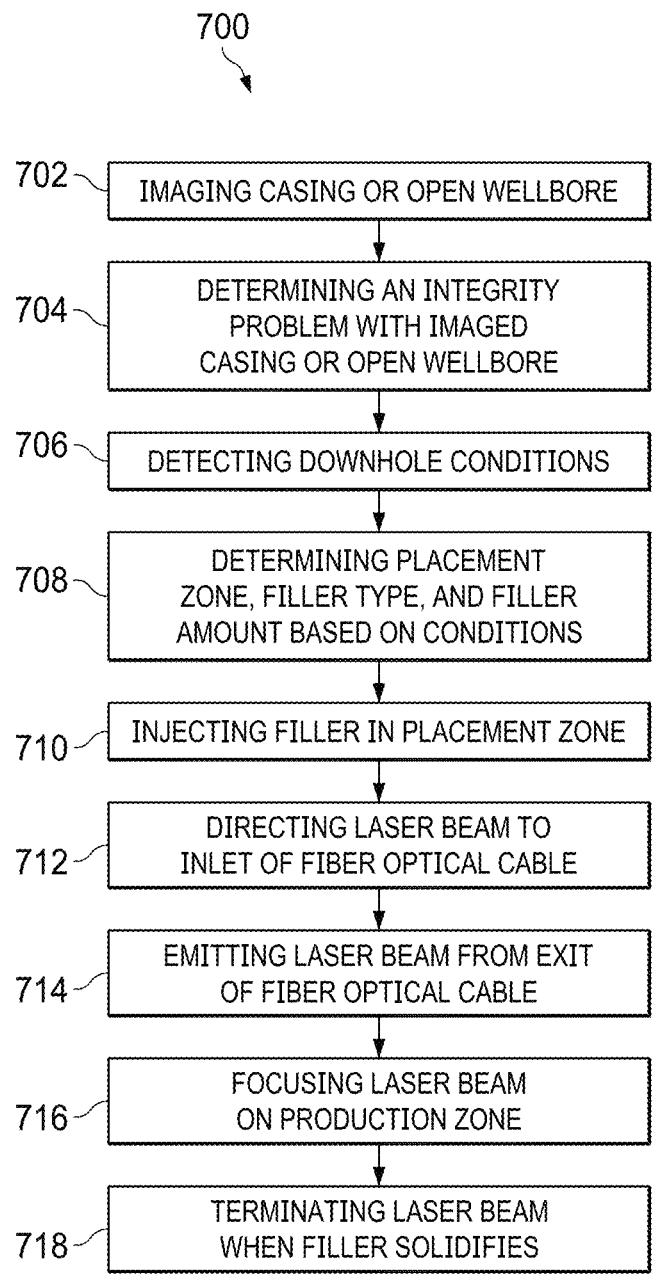
FIG. 7 is a flowchart illustrating an example method for laser-triggering filler in a wellbore in accordance with some implementations of the present disclosure.

FIG. 7 is a flowchart illustrating an example method 700 for repairing or otherwise reducing wellbore integrity problems. For clarity of presentation, the description that follows generally describes method 700 in the context of the other figures in this description. For example, method 700 can be performed by a computer system described in FIG. 8. However, it will be understood that method 700 may be performed, for example, by any suitable system, environment, software, and hardware, or a combination of systems, environments, software, and hardware, as appropriate. In some implementations, various steps of method 700 can be run in parallel, in combination, in loops, or in any order. In some implementations, the steps of method 700 can be run automatically.

Method 700 begins at step 702 where a 3D image is generated of a casing or open wellbore. For example, the 3D imaging tool 110 in FIG. 1 can generate a 3D image of the casing 104. At step 704, an integrity problem for a casing or open wellbore is determined based on the 3D image. In the example, the 3D imaging tool 110 can determine leaks in the casing 104 based on the 3D image. Next, at step 706, downhole conditions are detected. Returning to the example, the assembly 106 or, more specifically, the 3D imaging tool 110 may include one or more sensors to detect downhole conditions such as temperature, pressure, or other parameters. Parameters for filler material are determined at step 708. As for the example, the 3D imaging tool 110 may determine parameters based on one or more algorithms and the detected downhole conditions, and the parameters may include the type of filler material, placement zone, filler amount, or others. At step 710, filler material is injected into the placement zone. Returning to the example, the assembly 106 may inject the filler material into the placement zone in a specified amount. Next, at step 712, a laser beam is focused on the filler material in the production zone. As for the example, the 3D imaging tool 110 can transmit a command to the laser head 112 to focus the laser beam on the production zone in the casing 104. The command can identify a beam width and duration in some implementations of the present disclosure. At step 714, the laser beam is terminated to allow the triggered filler material to solidify. The laser beam is focused on the production zone at step 716, and the laser beam is terminated to enable the filler to solidify at step 718.

Figure 8:
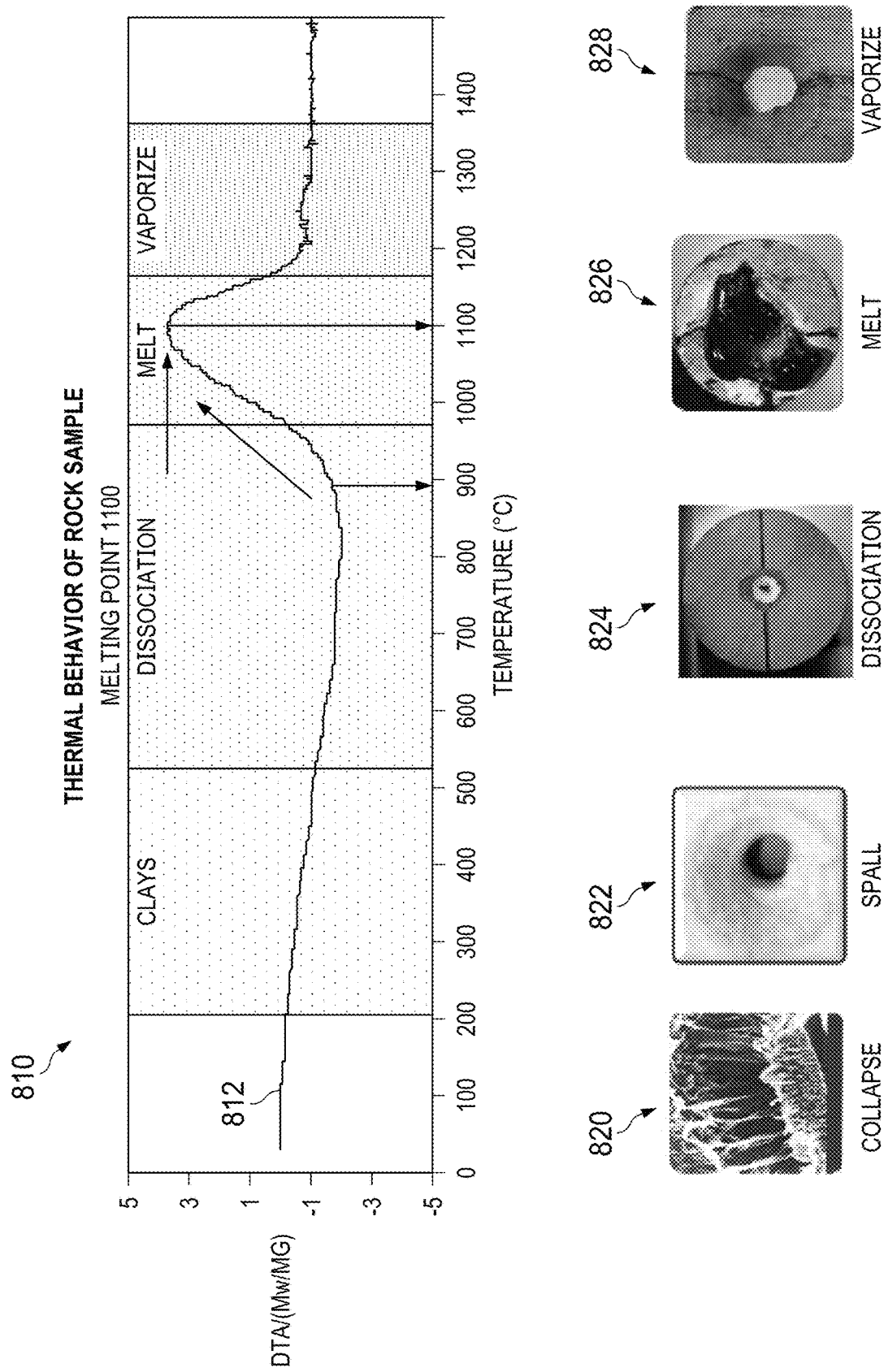
FIG. 8 illustrates example effects of laser sealing, according to an implementation.

FIG. 8 illustrates example effects of laser sealing, according to an implementation. FIG. 8 includes a chart 810 that illustrates example thermal analysis. The chart 810 includes a curve 812 for clay. As illustrated, clays can collapse under about 200 degrees, spall at about 400 degrees, dissociate at about 900 degrees, melt at about 1100 degrees, and vaporizes at about 1300 degrees. Pictures 820, 822, 824, 826, and 828 show example effects of collapsing, spalling, dissociation, melting, and vaporization, respectively. Other rock types may have different curves. For example, sandstone may melt at about 1400 degrees, and limestone may dissociate at 1100 degrees. In some cases, the type of rocks around the leaks to be fixed can be determined, and the laser beam can be configured to deliver the energy required to melt, vaporize or dissociated the rock. For example, the laser beam can be configured to melt the rocks in a sealing operation. The temperature increase on the rock is based on several factors, including rock type and thermal properties, rock color, laser power, spot size, and time. Therefore, rock temperature under the laser beam can be controlled based on these parameters.

In some implementations, the types of rocks can be determined based on one or more of the following techniques. In one example, the types of rocks can be determined based on off-set wells data. If the planned well is drilled in an area where other wells have been drilled previously, the information from these old and nearby wells (referred to offset wells) can be used to determine the formations that will be penetrated by the new well and the type of rocks comprising each formation. In another example, the types of rocks can be determined based on rock cuttings during the drilling process. During the drilling process of the new well, rock cuttings produced by the drill bit downhole are transported to the surface through the circulating drilling fluids and are filtered from the fluids using solids control equipment on the surface. These rock cuttings are used to characterize the type of rocks drilled and correlated to a depth interval. In yet another example, the types of rocks can be determined based on the trends and behaviors of the drill bit and drill string. During the drilling process, trends and behaviors of the drill bit and the drill string can be detected at the surface. These trends and behaviors can be used to predict a change of the rock type being drilled. For example, sudden changes in the rate of penetration (ROP) of the drill bit can be correlated to a change in the rock type drilled. In yet another example, the types of rocks can be determined based on measurement of MWD or LWD tools operating during the drilling process. Example measurements performed by these MWD or LWD tools can include gamma ray radiations, quantifying the hydrogen or neutron contents, measuring resistivity, and sonic waves travel times. In some cases, a combination of these techniques can be used to determine the types of rocks. Based on the types of rocks, different laser power, spot size, or time can be configured to obtain the target temperature to melt the rocks.

In some implementations, the sealing operation can also be directed to materials other than the rock formation at point of leaks. For example, the leak can be located at a downhole location on a casing tubular, and the laser beam can be directed to the portion of the casing tubular where the leak occurs.

Figure 9:
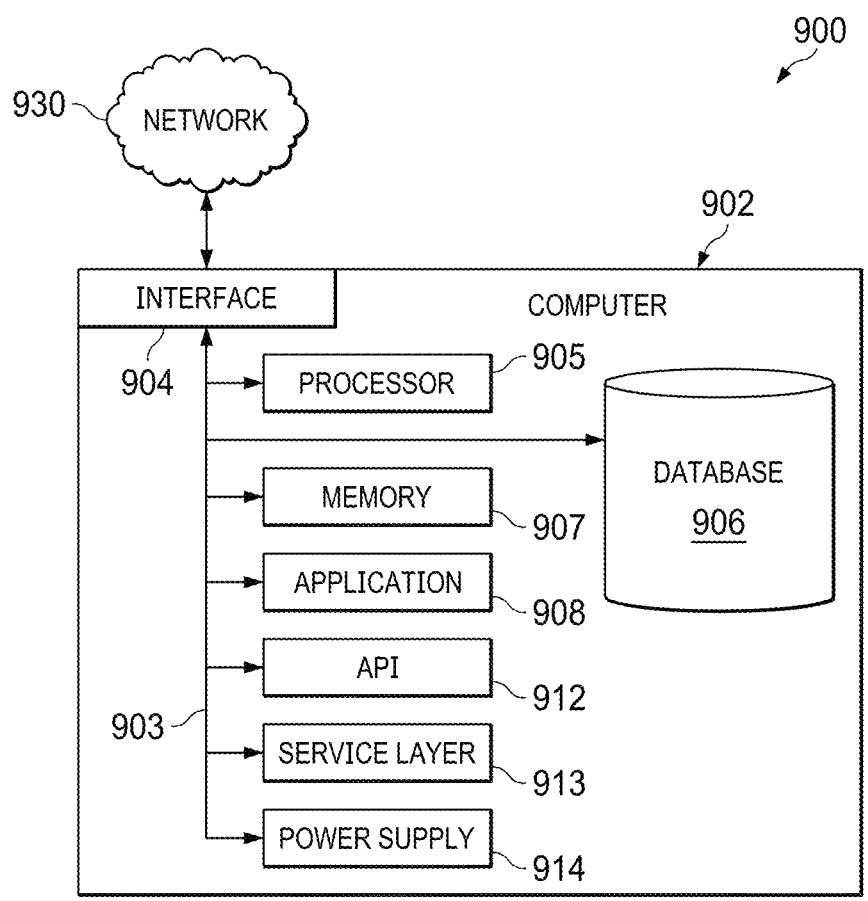
FIG. 9 is an example computing system in accordance with some implementation of the present disclosure.

FIG. 9 is a block diagram of an example computer system 900 used to provide computational functionalities associated with described algorithms, methods, functions, processes, flows, and procedures as described in the instant disclosure, according to an implementation. The illustrated computer 902 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 902 may comprise a computer that includes an input device, such as a keypad, keyboard, touch screen, or other device that can accept user information, and an output device that conveys information associated with the operation of the computer 902, including digital data, visual, or audio information (or a combination of information), or a graphical user interface (GUI).

The computer 902 can serve in a role as a client, network component, a server, a database or other persistency, or any other component (or a combination of roles) of a computer system for performing the subject matter described in the instant disclosure. The illustrated computer 902 is communicably coupled with a network 930. In some implementations, one or more components of the computer 902 may be configured to operate within environments, including cloud-computing-based, local, global, or other environment (or a combination of environments).

At a high level, the computer 902 is an electronic computing device operable to receive, transmit, process, store, or manage data and information associated with the described subject matter. According to some implementations, the computer 902 may also include or be communicably coupled with an application server, e-mail server, web server, caching server, streaming data server, or other server (or a combination of servers).

The computer 902 can receive requests over network 930 from a client application (for example, executing on another computer) and respond to the received requests by processing the received requests using the appropriate software application(s). In addition, requests may also be sent to the computer 902 from internal users (for example, from a command console or by other appropriate access method), external or third-parties, other automated applications, as well as any other appropriate entities, individuals, systems, or computers.

Each of the components of the computer 902 can communicate using a system bus 903. In some implementations, any or all of the components of the computer 902, both hardware or software (or a combination of hardware and software), may interface with each other or the interface 904 (or a combination of both) over the system bus 903 using an application programming interface (API) 912 or a service layer 913 (or a combination of the API 912 and service layer 913). The API 912 may include specifications for routines, data structures, and object classes. The API 912 may be either computer-language independent or dependent and may refer to a complete interface, a single function, or even a set of APIs. The service layer 913 provides software services to the computer 902 or other components (whether or not illustrated) that are communicably coupled to the computer 902. The functionality of the computer 902 may be accessible for all service consumers using this service layer. Software services, such as those provided by the service layer 913, provide reusable, defined functionalities through a defined interface. For example, the interface may be software written in JAVA, C++, or other suitable language providing data in extensible markup language (XML) format or other suitable format. While illustrated as an integrated component of the computer 902, alternative implementations may illustrate the API 912 or the service layer 913 as stand-alone components in relation to other components of the computer 902 or other components (whether or not illustrated) that are communicably coupled to the computer 902. Moreover, any or all parts of the API 912 or the service layer 913 may be implemented as child or sub-modules of another software module, enterprise application, or hardware module, without departing from the scope of this disclosure.

The computer 902 includes an interface 904. Although illustrated as a single interface 904 in FIG. 9, two or more interfaces 904 may be used according to particular needs, desires, or particular implementations of the computer 902. The interface 904 is used by the computer 902 for communicating with other systems that are connected to the network 930 (whether illustrated or not) in a distributed environment. Generally, the interface 904 comprises logic encoded in software or hardware (or a combination of software and hardware) and is operable to communicate with the network 930. More specifically, the interface 904 may comprise software supporting one or more communication protocols associated with communications such that the network 930 or interface's hardware is operable to communicate physical signals within and outside of the illustrated computer 902.

The computer 902 includes a processor 905. Although illustrated as a single processor 905 in FIG. 9, two or more processors may be used according to particular needs, desires, or particular implementations of the computer 902. Generally, the processor 905 executes instructions and manipulates data to perform the operations of the computer 902 and any algorithms, methods, functions, processes, flows, and procedures as described in the instant disclosure.

The computer 902 also includes a database 906 that can hold data for the computer 902 or other components (or a combination of both) that can be connected to the network 930 (whether illustrated or not). For example, database 906 can be an in-memory, conventional, or other type of database storing data consistent with this disclosure. In some implementations, database 906 can be a combination of two or more different database types (for example, a hybrid in-memory and conventional database) according to particular needs, desires, or particular implementations of the computer 902 and the described functionality. Although illustrated as a single database 906 in FIG. 9, two or more databases (of the same or combination of types) can be used according to particular needs, desires, or particular implementations of the computer 902 and the described functionality. While database 906 is illustrated as an integral component of the computer 902, in alternative implementations, database 906 can be external to the computer 902. As illustrated, the database 906 holds, for example, algorithms 916, and filler material properties 918.

The computer 902 also includes a memory 907 that can hold data for the computer 902 or other components (or a combination of both) that can be connected to the network 930 (whether illustrated or not). For example, memory 907 can be random access memory (RAM), read-only memory (ROM), optical, magnetic, and the like, storing data consistent with this disclosure. In some implementations, memory 907 can be a combination of two or more different types of memory (for example, a combination of RAM and magnetic storage) according to particular needs, desires, or particular implementations of the computer 902 and the described functionality. Although illustrated as a single memory 907 in FIG. 9, two or more memories 907 (of the same or a combination of types) can be used according to particular needs, desires, or particular implementations of the computer 902 and the described functionality. While memory 907 is illustrated as an integral component of the computer 902, in alternative implementations, memory 907 can be external to the computer 902.

The application 908 is an algorithmic software engine providing functionality according to particular needs, desires, or particular implementations of the computer 902, particularly with respect to functionality described in this disclosure. For example, application 908 can serve as one or more components, modules, or applications. Further, although illustrated as a single application 908, the application 908 may be implemented as multiple applications 908 on the computer 902. In addition, although illustrated as integral to the computer 902, in alternative implementations, the application 908 can be external to the computer 902.

There may be any number of computers 902 associated with, or external to, a computer system containing computer 902, each computer 902 communicating over network 930. Further, the term "client", "user", and other appropriate terminology may be used interchangeably, as appropriate, without departing from the scope of this disclosure. Moreover, this disclosure contemplates that many users may use one computer 902, or that one user may use multiple computers 902.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, a data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or be described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks.

The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20, or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any disclosure or on the scope of what may be claimed, but rather as descriptions of features that may be specific to particular implementations of particular disclosures. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A method, comprising:
   imaging a casing, completed wellbore, or open wellbore;
   determining an integrity problem with the casing, completed wellbore, or open wellbore based on the imaging;
   determining a placement zone for a filler, a filler amount, and filler parameters for the integrity problem, wherein the filler parameters comprise a filler type, a filler amount, and a shape of the integrity problem;
   injecting the filler in the filler amount in the placement zone; and
   solidifying the filler at the placement zone.

2. The method of claim 1, wherein imaging comprises capturing a two or three-dimensional image of the integrity problem.

3. The method of claim 1, further comprising:
   determining downhole conditions using one or more sensors; and
   further determining the filler parameters based on the downhole conditions.

4. The method of claim 3, wherein the downhole conditions comprises temperature and pressure.

5. The method of claim 1, wherein solidifying comprises at least one of directing a laser beam, an acoustical signal, or an electrical current at the placement zone.

6. The method of claim 1, wherein the integrity problem comprises at least one of a hole, a split, or a fracture, in the casing or wall of a completed or open wellbore.

7. A computer program product encoded on a non-transitory medium, the product comprising computer readable instructions for causing one or more processors to perform operations comprising:
   imaging a casing, completed wellbore, or open wellbore;
   determining an integrity problem with the casing, completed wellbore, or open wellbore based on the imaging;
   determining a placement zone for a filler, a filler amount, and filler parameters for the integrity problem, wherein the filler parameters comprise a filler type, a filler amount, and a shape of the integrity problem;
   injecting the filler in the filler amount in the placement zone; and
   solidifying the filler at the placement zone.

8. The computer program product of claim 7, wherein imaging comprises capturing a two or three-dimensional image of the integrity problem.

9. The computer program product of claim 7, the instructions further comprising:
   determining downhole conditions using one or more sensors; and
   further determining the filler parameters based on the downhole conditions.

10. The computer program product of claim 9, wherein the downhole conditions comprises temperature and pressure.

11. The computer program product of claim 7, wherein solidifying comprises at least one of directing a laser beam, an acoustical signal, or an electrical current at the placement zone.

12. The computer program product of claim 7, wherein the integrity problem comprises at least one of a hole, a split, or a fracture, in the casing or wall of a completed or open wellbore.

13. A system, comprising:
   one or more processors; and
   a non-transitory computer-readable storage medium coupled to the one or more processors and storing programming instructions for execution by the one or more processors, the programming instructions instruct the one or more processors to:
      image a casing, completed wellbore, or open wellbore;
      determine an integrity problem with the casing, completed wellbore, or open wellbore based on the imaging;
      determine a placement zone for a filler, a filler amount, and filler parameters for the integrity problem, wherein the filler parameters comprise a filler type, a filler amount, and a shape of the integrity problem;
      inject the filler in the filler amount in the placement zone; and
      solidify the filler at the placement zone.

14. The system of claim 13, wherein imaging comprises capturing a two or three-dimensional image of the integrity problem.

15. The system of claim 13, the instructions further instruct the one or more processors to:
   determine downhole conditions using one or more sensors; and
   further determine the filler parameters based on the downhole conditions.

16. The system of claim 15, wherein the downhole conditions comprises temperature and pressure.

17. The system of claim 13, wherein solidifying comprises at least one of directing a laser beam, an acoustical signal, or an electrical current at the placement zone.

18. The system of claim 13, wherein the integrity problem comprises at least one of a hole, a split, or a fracture, in the casing or wall of a completed or open wellbore.

* * * * *